US 8,715,434 B2

(12) United States Patent
Lindgren et al.

(10) Patent No.: US 8,715,434 B2
(45) Date of Patent: *May 6, 2014

(54) METHOD OF REMOVING AN OUT-OF-TOLERANCE AREA IN A COMPOSITE STRUCTURE

(71) Applicant: The Boeing Company, Chicago, IL (US)

(72) Inventors: Lawrence S Lindgren, Redmond, WA (US); Scott W. Lea, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,750

(22) Filed: Jul. 30, 2013

(65) Prior Publication Data

US 2013/0307174 A1 Nov. 21, 2013

Related U.S. Application Data

(62) Division of application No. 12/693,919, filed on Jan. 26, 2010, now Pat. No. 8,524,020.

(51) Int. Cl.
| | | |
|---|---|---|
| *B32B 41/00* | (2006.01) | |
| *B29C 73/10* | (2006.01) | |
| *B29C 73/06* | (2006.01) | |
| *B29C 73/24* | (2006.01) | |
| *B29C 73/26* | (2006.01) | |
| *G05B 19/401* | (2006.01) | |

(52) U.S. Cl.
CPC .............. *B29C 73/10* (2013.01); *B29C 73/06* (2013.01); *B29C 73/24* (2013.10); *B29C 73/26* (2013.01); *B29C 2073/264* (2013.01); *G05B 19/401* (2013.01)

USPC ............ 156/64; 156/350; 156/351; 156/353; 156/360; 156/367; 156/378; 156/379

(58) Field of Classification Search
CPC ........ B29C 73/06; B29C 73/10; B29C 73/24; B29C 73/26; B29C 2073/264; G05B 19/401
USPC ........... 156/64, 350, 351, 353, 360, 367, 378, 156/379
See application file for complete search history.

(56) References Cited

U.S. PATENT DOCUMENTS

| 4,588,626 A | 5/1986 | Cologna et al. |
| 4,820,564 A | 4/1989 | Cologna et al. |

(Continued)

FOREIGN PATENT DOCUMENTS

| EP | 0359660 | 3/1990 |
| EP | 1400310 | 3/2004 |
| WO | WO2004106847 | 12/2004 |

OTHER PUBLICATIONS

EP Examination Report for Application No. 10720507.2-1702, dated Mar. 7, 2013.

(Continued)

*Primary Examiner* — Katarzyna Wyrozebski Lee
*Assistant Examiner* — Joshel Rivera

(57) ABSTRACT

A method of removing an out-of-tolerance area in a composite structure may comprise determining a location of the out-of-tolerance area within the composite structure, and selecting a volume of the composite structure to be removed based on the location of the out-of-tolerance area. The method may further include programming a machine tool to remove the volume and to pause after removal of each one of a quantity of layers of the volume. The method may additionally include removing one of the layers using the machine tool.

18 Claims, 12 Drawing Sheets

(56) References Cited

U.S. PATENT DOCUMENTS

| | | |
|---|---|---|
| 4,961,799 A | 10/1990 | Cologna et al. |
| 5,023,987 A | 6/1991 | Wuepper et al. |
| 5,034,254 A | 7/1991 | Cologna et al. |
| 5,207,541 A | 5/1993 | Westerman et al. |
| 5,827,598 A | 10/1998 | Larsen et al. |
| 5,882,756 A | 3/1999 | Alston et al. |
| 6,084,206 A | 7/2000 | Williamson et al. |
| 6,174,392 B1 | 1/2001 | Reis |
| 6,373,028 B2 | 4/2002 | Williamson et al. |
| 6,761,783 B2 | 7/2004 | Keller et al. |
| 7,368,073 B2 | 5/2008 | Krogager et al. |
| 7,398,698 B2 | 7/2008 | Griess et al. |
| 7,448,270 B2 | 11/2008 | Kollgaard |
| 2006/0053891 A1 | 3/2006 | Georgeson et al. |
| 2007/0095140 A1 | 5/2007 | Kollgaard |
| 2007/0100582 A1 | 5/2007 | Griess et al. |
| 2007/0118313 A1 | 5/2007 | Vaccaro |
| 2008/0000299 A1 | 1/2008 | Georgeson |
| 2008/0281554 A1 | 11/2008 | Cork et al. |
| 2009/0095378 A1 | 4/2009 | Barker |

OTHER PUBLICATIONS

Written Opinon of the International Searching Authority, International Search Report, Aug. 4, 2010.

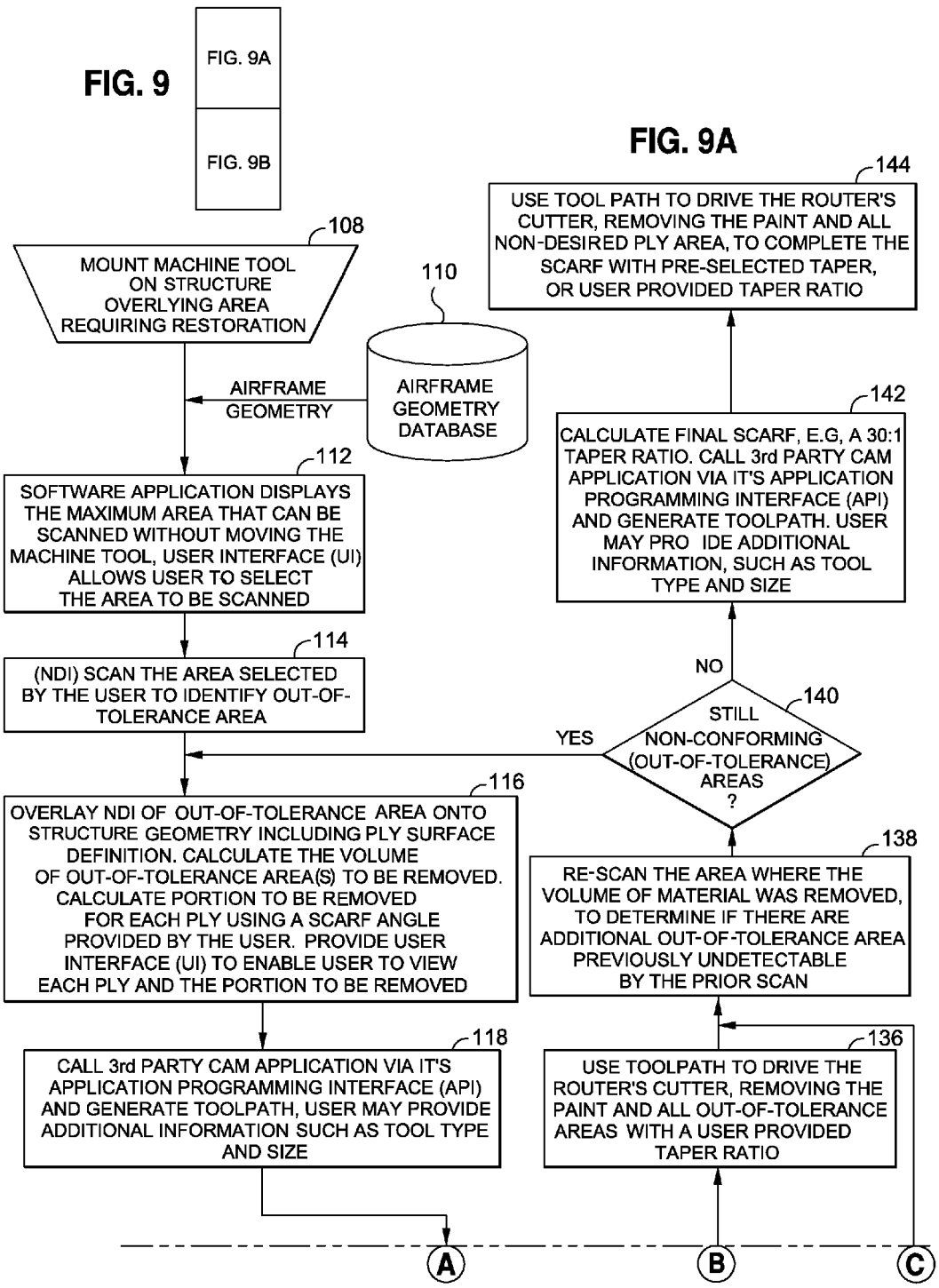

METHOD OF REMOVING AN OUT-OF-TOLERANCE AREA IN A COMPOSITE STRUCTURE

CROSS-REFERENCE TO RELATED APPLICATIONS

The present application is a divisional application of and claims priority to pending application Ser. No. 12/693,919 filed on Jan. 26, 2010 and entitled USER-FACILITATED MATERIAL REMOVAL IN COMPOSITE STRUCTURES, which is a continuation-in-part application of pending application Ser. No. 12/485,832 filed on Jun. 16, 2009 and entitled AUTOMATED MATERIAL REMOVAL IN COMPOSITE STRUCTURES, the entire contents of each one of the above-referenced applications being expressly incorporated by reference herein.

FIELD

The present disclosure relates generally to composite structures and, more particularly, to a method and apparatus for removing out-of-tolerance areas within a composite structure in relation to restoring the composite structure.

BACKGROUND

Composite structures occasionally include localized areas in the composite structure that may not conform to product and/or performance specifications for any one of a variety of reasons. For example, areas of the structure may be out-of-tolerance because of inconsistencies such as, without limitation, voids, dents, porosities and bow waves. A bow wave may be characterized as a local distortion or ripple in one or more plies of a composite structure and may occur during the process of manufacturing or curing of the composite structure.

Such localized areas of composite structures may be reworked in order to reduce or eliminate non-conformities and thereby restore the structure. The rework process may include removing material from the structure and then replacing the removed material with a composite patch that may be bonded to the structure. During the material removal process, the edges of the rework area may be tapered, scarfed or formed in any one of a variety of alternative configurations in order to form a scarf joint, a step-lap joint or any alternative joint configuration between the structure and the bonded patch.

The above-described rework process may require manual removal of the material by a skilled technician using a hand-held grinder or similar tool. The manual removal of composite material may be labor intensive. Furthermore, the accuracy with which the composite material may be removed may be dependant upon the expertise of the technician. In this regard, the consistency of the rework of composite structures may vary.

Accordingly, there is a need for a method and apparatus for reworking or restoring composite structures in which the localized removal of material to eliminate out-of-tolerance areas is rapid, accurate and predictable, while minimizing manual effort.

SUMMARY

The disclosed embodiments provide a method and apparatus for reworking and/or restoring out-of-tolerance areas of composite structures in which material is removed from the structure by a user-facilitated process in order to provide consistent, predictable and accurate results. A machine head operated in a user-facilitated manner by a programmable numerical controller may include a video camera to allow for video scanning of the structure in order to locate out-of-tolerance areas. The machine head may remove material from the structure based upon the location of additional out-of-tolerance areas revealed by the video scan.

A cutting tool on the machine head may remove the material from the structure and form a scarf in the structure surrounding the area being reworked. The scarf may facilitate the formation of a scarf joint between the structure and a repair patch that may be bonded to the scarf joint to restore the structure. The steps of removing a user-defined quantity of layers of material, pausing after removal of the removal of each one of the layers, video scanning the area uncovered by the removal of the layer to locate additional out-of-tolerance areas, and editing the tool path of the machine head such that the volume of material for removal includes the additional out-of-tolerance area may be iteratively performed to eliminate multiple out-of-tolerance areas in the structure.

In an embodiment, a method of removing at least one out-of-tolerance area in a composite structure comprises the steps of determining the location of the out-of-tolerance area within the structure. A volume may be selected for removal from the composite structure based on the location of the out-of-tolerance area in the composite structure. The method may include the use of a machine tool which may be programmed to remove the volume and to pause after removal of each one of a quantity of layers of the volume. The method may further include removing one of the layers using the programmed machine tool.

In a further embodiment, disclosed is a method of restoring a composite structure having at least one out-of-tolerance area. The method may comprise the steps of locating the boundaries of the out-of-tolerance area within the structure and calculating a volume of material for removal from the composite structure based upon the boundaries. A tool path may be calculated for guiding a machine tool for removal of the volume. A quantity of layers may be selected for the volume to allow for pausing of the machine tool following removal of each one of the layers. A controller may be programmed with the calculated tool path and the quantity of layers of the volume. The method may include removing one of the layers using the machine tool and pausing the machine tool after removal of the layer.

The area of the composite structure uncovered by the removal of the layer may be scanned such as with a video camera to locate the boundaries of an additional out-of-tolerance area. The controller programming may be edited such that the volume of material for removal includes the additional out-of-tolerance area. The above-mentioned steps of removing one of the layers, pausing the machine tool, scanning the area of the composite structure uncovered by the removal of the layer, and editing the controller programming, may be iteratively performed until the volume of material is removed. The volume of the composite structure removed by the machine tool may then be replaced.

Also disclosed is a method of restoring a composite airframe containing at least one out-of-tolerance area. The method may comprise mounting a machine tool on the airframe and locating the boundaries of the out-of-tolerance area in the airframe. A set of data defining the airframe geometry may be retrieved for use in calculating a volume of material of the airframe to be removed based on the boundaries of the out-of-tolerance area and the airframe geometry. A quantity of layers of the volume may be selected for which the machine tool may be paused following removal of each one of the layers. The controller may be programmed with a tool path and the quantity of layers. The method may include removing one of the layers using the machine tool, pausing the machine tool after removal of the layer, and scanning the area of the airframe uncovered by the removal of the layer to determine the existence of an additional out-of-tolerance area.

The above-mentioned methods may be performed using a machine tool configured for removing at least one out-of-tolerance area in a composite structure. The machine tool may comprise a machine head movable along at least one axis over the composite structure and at least one of a video camera and a non-destructive inspection (NDI) scanner mounted to the machine head for scanning the composite structure and locating the out-of-tolerance area. The machine tool may further comprise a cutting tool mounted to the machine head and which may be movable along a tool path for removing a volume containing the out-of-tolerance area. A controller may also be included and may be programmable with a quantity of layers of the volume for which the cutting tool may be paused following removal of each one of the layers. The machine tool may additionally comprise a user interface coupled with the computer for editing the tool path and/or the quantity of layers of the volume.

In a further embodiment, the machine tool may be configured to remove a plurality of out-of-tolerance area in a multi-ply composite structure. The machine tool may comprise a frame configured to be placed on the composite structure and a machine head mounted to the frame movable along at least one axis over the composite structure. A video camera and/or a non-destructive inspection (NDI) scanner may be mounted to the machine head for scanning the composite structure and locating the out-of-tolerance area. The machine tool may additionally comprise a cutting tool mounted to the machine head for removing a volume containing the out-of-tolerance area.

A computer may be included for calculating a volume and generating a tool path for the machine tool. A controller may be coupled with the computer for controlling the movement of the machine head and the operation of the cutting tool. The controller may be programmable with a quantity of layers of the volume for which the machine tool is paused following removal of each one of the layers. The machine tool may include a user interface coupled with the computer for editing the tool path and/or the quantity of layers of the volume. A display may be coupled to the user interface for viewing an image of the volume of the composite structure to be removed and/or for viewing video feed from the video camera of the area uncovered by the removal of the layer.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

FIG. 9 is a schematic illustration of first and second portions of a flow diagram map respectively comprising FIGS. 9A and 9B that make up a flow diagram of a further embodiment of a methodology of user-facilitated removal of material from the composite structure;

FIG. 9A—is an illustration of the first portion of the flow diagram of the methodology of user-facilitated material removal from the composite structure;

DETAILED DESCRIPTION

Figure 1:
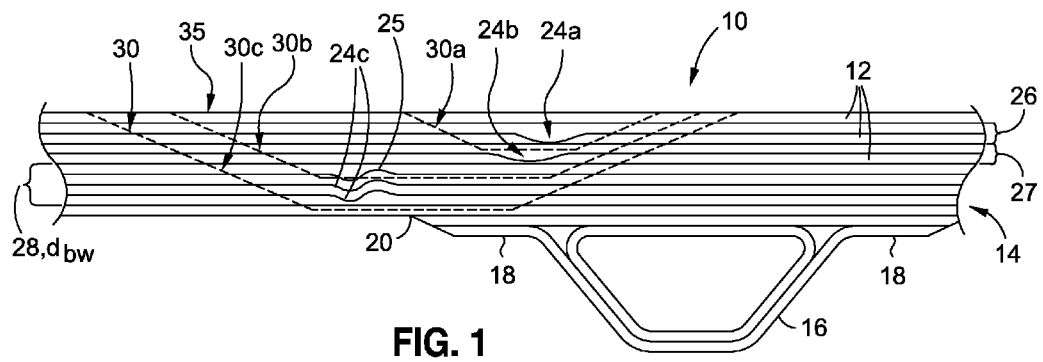
FIG. 1 is an illustration of a sectional view of a composite structure having out-of-tolerance areas and which may be contained within one or more volumes for removal from the composite structure.

FIG. 1 illustrates a composite structure 10 comprising a plurality of laminated plies 12 of composite material which may be formed of, for example and without limitation, a fiber reinforced resin. The composite structure 10 may comprise a skin 14 formed of the plurality of plies 12. Although not shown in the figures, the composite structure 10 may include one or more cores to provide additional stiffness or other structural properties. The composite structure 10 illustrated in FIG. 1 may include a stringer 16 or a variety of other substructure, without limitation, and which may be located on a side of the skin 14 opposite the surface 35. In the illustrated example, the composite structure 10 includes three out-of-tolerance areas 24a, 24b, 24c respectively located in differing layers 26, 27, 28 of the plies 12 beneath the surface 35. For example, layers 26, 27 and 28 may include plies 12 within which out-of-tolerance areas 24a, 24b and 24c are respectively contained. As used herein, "out-of-tolerance" and "out-of-tolerance area" refer to localized areas in the composite structure 10 that may have undesired properties or features, or which may be outside of designed tolerances or which may not meet product or performance specifications for any one of a variety of reasons.

An out-of-tolerance area may comprise, for example and without limitation, any one of numerous types of inconsistencies including a void, a dent, a ply separation, a delamination, thermal degradation, a ply wrinkle, a disbond, porosity, or a bow wave that may occur at the time the composite structure is manufactured or later during the service life of the composite structure. In FIG. 1, the bow wave 25 is illustrated as being located adjacent to an edge 20 of the flange 18 of the stringer 16 although the bow wave 25 may be formed at any location in the composite structure 10.

In accordance with the disclosed embodiments, one or more volumes 30a, 30b, 30c of material may be removed from the composite structure 10 that are respectively inclusive of out-of-tolerance areas 24a, 24b, 24c in order to eliminate or reduce the size of the out-of-tolerance areas 24a, 24b, 24c. For example, the bow wave 25 illustrated in FIG. 1 may be included in the out-of-tolerance area 24c. In this regard, the bow wave 25 may be formed as a ripple or wave in one or more of the plies 12 of the composite structure 10. The out-of-tolerance areas 24a, 24b, 24c may be removed from the composite structure 10 by respectively removing the volumes 30a, 30b, 30c of material from the composite structure 10. Each one of the volumes 30a, 30b, 30c may have an outline or periphery that may be of any one of a variety of geometries including, but not limited to, round and oval shapes.

Figure 2:
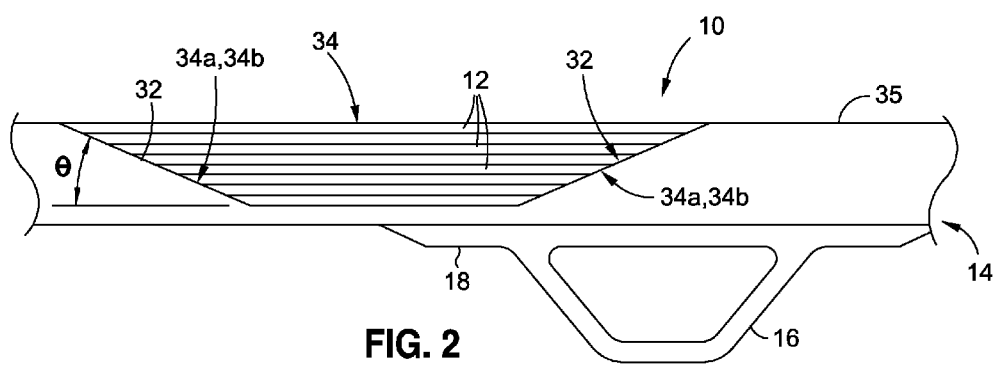
FIG. 2 is an illustration of a sectional view of the composite structure similar to that which is shown in FIG. 1 and illustrating a completed restoration in which the volumes of the composite structure have been removed and replaced by a repair patch.

Referring now also to FIG. 2, the volume 30c of material shown in FIG. 1 comprises the final volume 30 of material. The volume 30c of material may be removed in a manner so as to form a final scarf 32 (FIG. 2) that may be tapered or inclined at a pre-selected scarf angle θ. In this regard, the volume 30c of material shown in FIG. 1 may comprise the final volume 30 of material that is removed from the composite structure 10 to eliminate or reduce the size of the out-of-tolerance areas 24a, 24b, 24c. As shown in FIG. 2, a composite patch 34 may be bonded to the composite structure 10 and may comprise, without limitation, multiple plies 12 of composite material. The composite patch 34 preferably fills the volume 30c (FIG. 1) of material removed from the composite structure 10. As shown in FIG. 2, the peripheral edges 34a of the composite patch 34 may include a scarf 34b that may substantially match the final scarf angle θ of the final volume 30 so as to form a bonded scarf joint between the composite patch 34 and the composite structure 10.

Figure 3A:
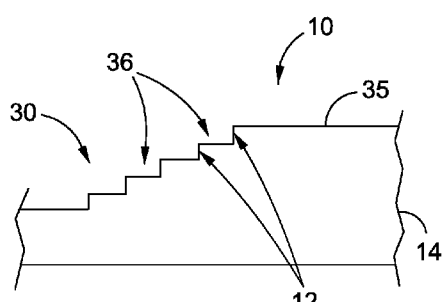
FIG. 3A is an illustration of a sectional view of a volume after removal from a composite structure and in which the edges of the removed volume are provided with step laps in preparation for the repair patch.

While a final scarf 32 as shown in FIG. 2 may be desirable for many applications, it may also be possible to remove the final volume 30 (FIG. 1) of material from the composite structure 10 so as to form a series of peripheral step laps 36, as shown in FIG. 3A, in which the height of each step lap 36 substantially matches the thickness of a corresponding ply 12 (FIG. 1). The peripheral step laps 36 shown in FIG. 3A may substantially match a series of similar step laps (not shown) formed on a patch (not shown) to form a step lap joint (not shown) between the patch 34 and the composite structure 10.

Figure 3B:
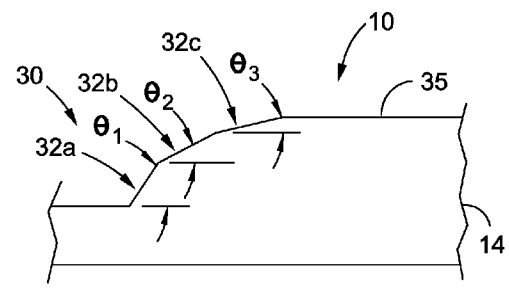
FIG. 3B is an illustration of a sectional view similar to that which is shown in FIG. 3A and illustrating the edges of the removed volume being scarfed with multiple scarf angles.

Similarly, as shown in FIG. 3B, material may be removed from the composite structure 10 during the restoration process so as so form a series of substantially contiguous scarfs 32a, 32b, 32c respectively having differing scarf angles θ1, θ2, θ3. The multiple scarfs 32a, 32b, 32c formed during removal of the final volume 30 of material from the composite structure 10 may match corresponding scarfs (not shown) formed on the composite patch 34 (FIG. 2).

Figure 4:
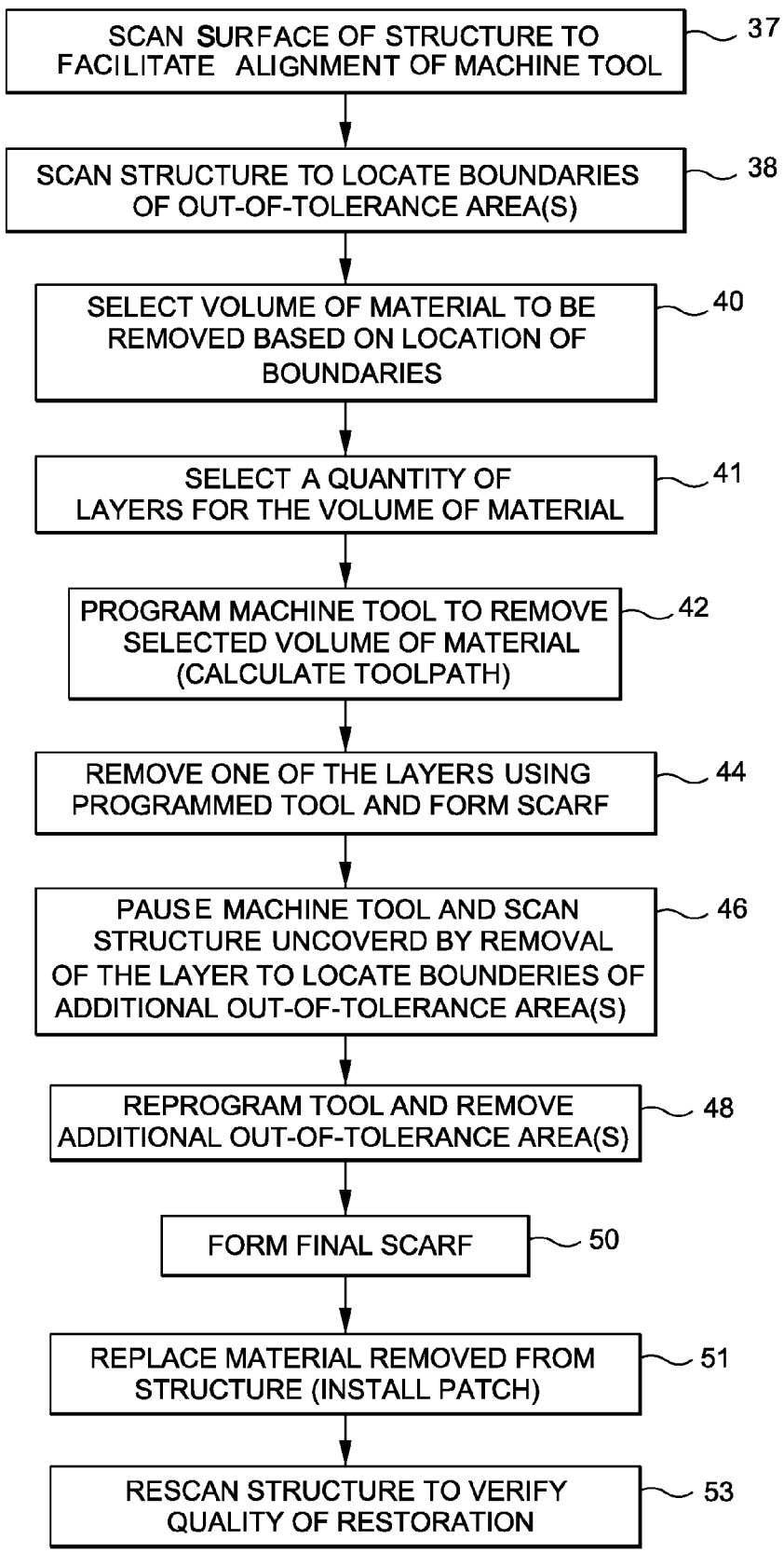
FIG. 4 is an illustration of a flow diagram of a user-facilitated methodology for removing material from the composite structure.

Attention is now directed to FIG. 4 which broadly illustrates a methodology of restoring a composite structure 10. The methodology facilitates user-intervention of a generally automated process of removal of one or more out-of-tolerance areas 24a, 24b, 24c (FIG. 1) in the composite structure 10 using a machine tool 52 (FIGS. 5-7) which may be mounted to the composite structure 10. For example, the methodology facilitates user-modification of the automated process wherein the process may be programmed to pause at predetermined intervals during removal of one or more of the volumes 30a, 30b, 30c (FIG. 1) such that the user may visually observe the areas of the composite structure 10 (FIG. 1) uncovered during the removal process. In this manner, the user may identify additional out-of-tolerance areas in the composite structure such as bow waves that may be undetectable during an initial scanning of the composite structure and/or may not be included in a design representation (e.g., a ply stacking sequence) of the composite structure. Upon visual observation of an additional out-of-tolerance area, the user may modify the automated removal process such that the additional out-of-tolerance area is included in one or more of the volumes 30a, 30b, 30c (FIG. 1) to be removed.

Referring still to FIG. 4, step 37 may comprise scanning the surface 35 (FIG. 1) of the structure using the machine tool 52 (FIGS. 5-7) to facilitate machine-to-structure alignment using a device such as a triangulation/line scan laser (not shown) or touch probe to measure distance. Alternatively, a laser tracker (not shown) or a laser positioning system (not shown) may be used to locate the machine tool relative to the structure in a known x, y, z coordinate system (not shown). For example, the machine tool 52 (FIGS. 5-7) may be aligned using a coordinate system of an aircraft (FIG. 11) of which the structure may form a part such that when the machine tool is located on the composite structure, a geometry database 68 (FIG. 5) may be used to identify the geometry of the composite structure. After multiple points on the surface are measured, the information may be stored and used to calculate the alignment of the machine tool with the composite structure.

Referring still to FIG. 4, step 38 may comprise internally scanning the composite structure to locate the boundaries of one or more out-of-tolerance areas 24a, 24b, 24c (FIG. 1) which may require removal as part of the restoration process. As will be discussed below in greater detail, the scanning process may be carried out using any one of a variety of nondestructive inspection (NDI) techniques including, without limitation, ultrasonic inspection.

At step 40, an initial volume 30a (FIG. 1) of material within the structure may be selected based upon the location of the out-of-tolerance area 24a (FIG. 1) identified during the scanning step 38. In the example illustrated in FIG. 1, the out-of-tolerance areas identified during the initial scanning process may be limited to the out-of-tolerance area 24a due to obscuring of the out-of-tolerance area 24b by the overlying out-of-tolerance area 24a. In this regard, the out-of-tolerance area 24b may not be detectable during the initial scanning step 38. In a similar manner, out-of-tolerance area 24c (FIG. 1) comprising the bow wave 25 (FIG. 1) may be undetectable using NDI techniques or other inspection technique. Thus, the initial volume 30a of material removed from the structure may be limited to layer 26 (FIG. 1) which may contain the out-of-tolerance area 24a (FIG. 1).

At step 41 of FIG. 4, the method may further comprise selecting a quantity of layers into which the volume to be removed may be divided. In this regard, the selection of the quantity of the layers determines the frequency at which the machine tool pauses during removal of a volume of material. For example, the volume of material to be removed may comprise a total of twenty (20) plies and which may be divided into five (5) layers such that each layer contains four (4) plies. The machine tool may be programmed to pause after removal of each one of the layers (i.e., after removal of each set of four (4) plies to allow the user of the machine tool to visually observe the area uncovered by the removal of the layer to identify additional out-of-tolerance areas previously undetected prior to removal of the next layer (e.g., removal of the next set of four plies).

Referring still to FIG. 4, at step 42, the process of programming the machine tool 52 (FIGS. 5-7) may further include calculating a tool path (not shown) that may be followed by a material removal tool (not shown) which may be mounted to the machine tool. For example, the material removal tool may comprise, without limitation, a mill or other cutting tool (not shown) that may be controlled by a suitable controller such as a computer numerical controller 58 (CNC) (FIG. 5) as described in greater detail below. Following the calculation of the tool path in step 42 of FIG. 4, the machine tool 52 (FIGS. 5-7) may initiate the removal of the volume of material at step 44 by removing one of the layers. As the layer of the volume of material is being removed at step 44, an initial scarf 32a (FIG. 1) may be formed which may have a scarf angle that may be the same or different than a final scarf angle θ (FIG. 2).

Referring still to FIG. 4, upon removal of the layer of the volume of material, the machine tool may pause at step 46 and the area uncovered by the removal of the layer may be scanned in order to locate the boundaries of any additional out-of-tolerance areas that may exist under the newly-exposed surface of the structure 10. In the illustration of FIG. 1, the scanning step 46 may result in the location of the boundaries of the out-of-tolerance area 24b (FIG. 1) which may reside within layer 27 (FIG. 1) of material located beneath the removed layer 26 (FIG. 1) containing the out-of-tolerance area 24a (FIG. 1). At step 48, the machine tool may be reprogrammed to remove an additional volume 30b (FIG. 1) of material which may includes layer 28 (FIG. 1). The steps of removing one of the layers using the machine tool, pausing the machine tool after removal of the layer, and scanning the area of the structure uncovered by the removal of the layer may be repeated until no additional out-of-tolerance areas are identified during the internal scanning of the structure.

Following the identification and removal of all of the out-of-tolerance areas 24a, 24b, 24c (FIG. 1), the final scarf 32 (FIG. 2) may be formed at step 50 such that the scarf is formed with the desired final scarf angle θ (FIG. 2). At step 51, the material that has been removed from the structure may be replaced by an integrated patch 34 (FIG. 2). If desired, the restored structure may be rescanned at step 53 in order to verify the desirability of the completed rework or restoration.

Figure 5:
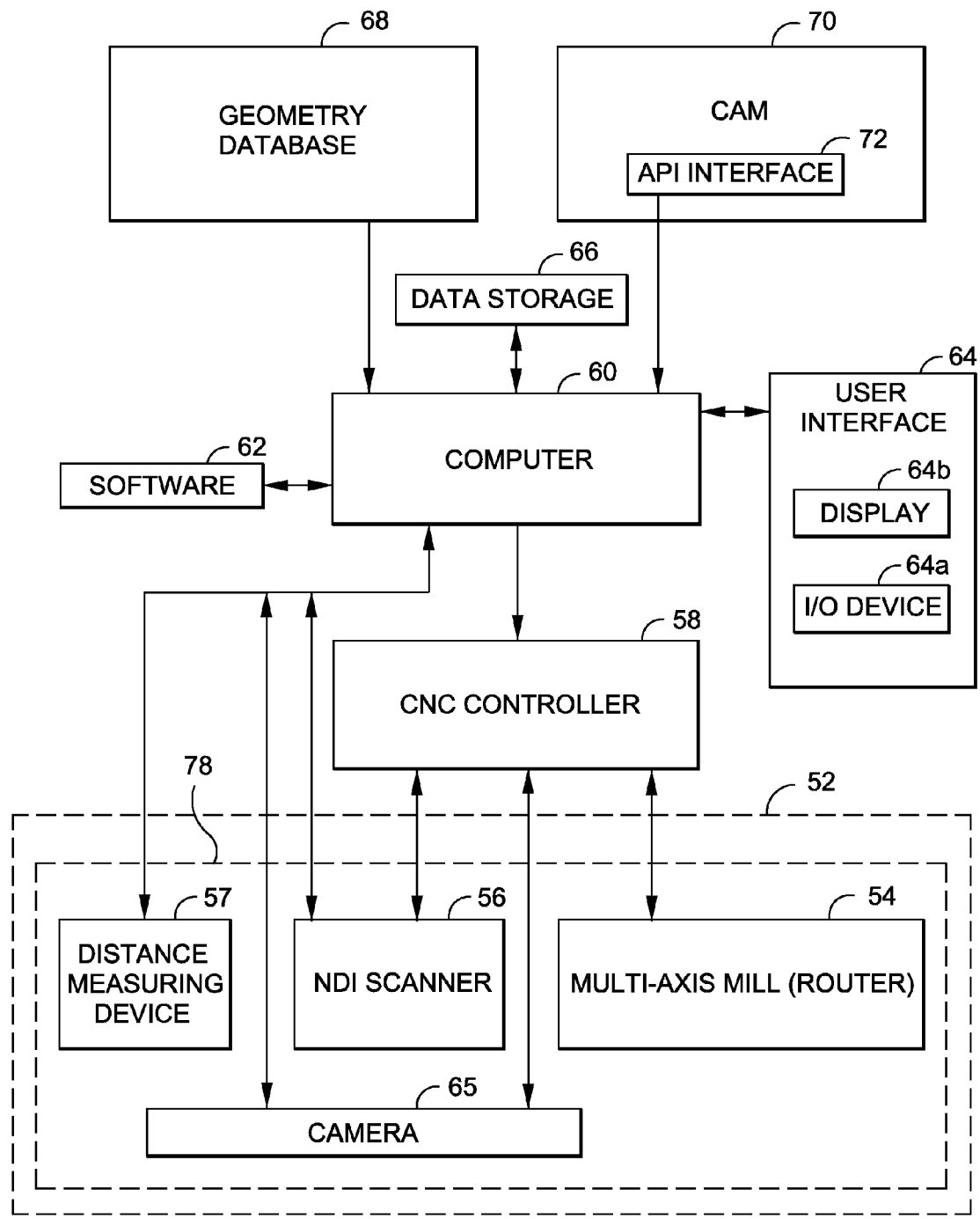
FIG. 5 is an illustration of a block diagram of a machine tool for user-facilitated removal of material from the composite structure and which may be employed to carry out the methodology illustrated in FIG. 4.

FIG. 5 illustrates, in block diagram form, components of an apparatus that may be used to carry out the material removal method described above. In an embodiment, the machine tool 52 may include a nondestructive inspection (NDI) scanner 56, a mill or router 54, a distance measuring device 57 and a video camera 65 which may be mounted on a machine head 78. The distance measuring device 57 may comprise a triangulation or line scan laser to measure the distance between the machine tool 52 and the surface 35 (FIG. 6) of the structure 10 (FIG. 6) although the distance measuring device may be provided in a variety of configurations. After measuring the distance from the machine tool to one or more points or locations on the surface, the information may be stored and used to calculate alignment of the machine tool with the composite structure.

The NDI scanner 56 may comprise any of a variety of devices using known technologies to essentially map internal areas of the structure. For example and without limitation, the scanner 56 may employ high and low frequency ultrasound including pulse echo ultrasonic techniques, ultrasonic resonance, infrared thermography, laser shearography, backscatter X-ray, electro-magnetic sensing and terahertz sensing technology. The video camera 65 may comprise a solid state video camera or similar optical recording array for viewing and recording images of the material being removed by the router 54. However, the camera 65 may be configured in any one of a variety of technologies for recording images of the composite structure and which may be fed to a display 64b for viewing by an operator of the machine tool or other user to facilitate editing of the programming of the machine tool during the restoration process.

Referring still to FIG. 5, movement of the machine head 78 over the surface of the composite structure, as well as operation of the scanner 56, router 54 and video camera 65 may be controlled by a CNC (computer numerically controlled) controller 58 although a controller of any suitable configuration may be used. Information generated by the scanner 56 may be delivered to the computer 60 which may be used to program the CNC controller 58 to remove the material such as on a layer-by-layer basis. Images recorded by the video camera 65 of the area uncovered by the removal of each layer may be fed to the display 64b for observation by the user. The user may analyze the images to determine whether to revise the quantity of layers that make up the volume. In this regard, the user may increase the quantity of layers into which the volume is divided in order to reduce the quantity of plies that are removed with the removal of each layer. Conversely, the user may decrease the quantity of layers into which the volume is divided in order to increase the quantity of plies that are removed with the removal of each layer.

As illustrated in FIG. 5, the computer 60 may be controlled by one or more software programs 62 and may have access to one or more geometry databases 68 which may contain information defining the geometry and ply make-up of one or more composite structures that may be restored or reworked. The computer 60 may also be coupled with a computer automated manufacturing system (CAM) 70 which may interface with the computer 60 via an application programming interface (API) 72 or any other suitable interface. A user interface 64 may be provided which may include an input/output I/O device 64a and the display 64b in order to allow a user to view and edit information developed by the computer 60 for programming the CNC controller 58. The computer 60 may be provided with data storage 66 to allow for storage and retrieval of archival data related to past restorations or reworks performed on various composite structures.

Figure 6:
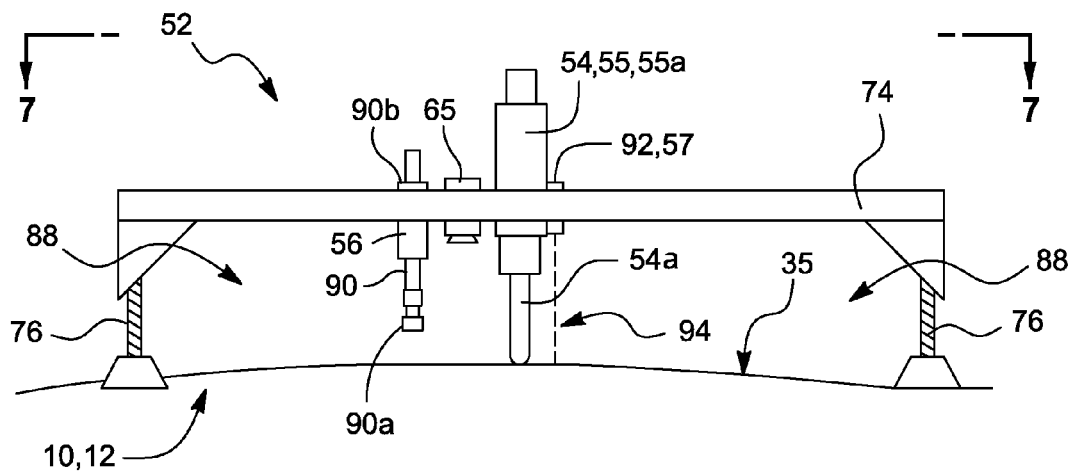
FIG. 6 is an illustration of a side view of the machine tool shown in FIG. 5.
Figure 7:
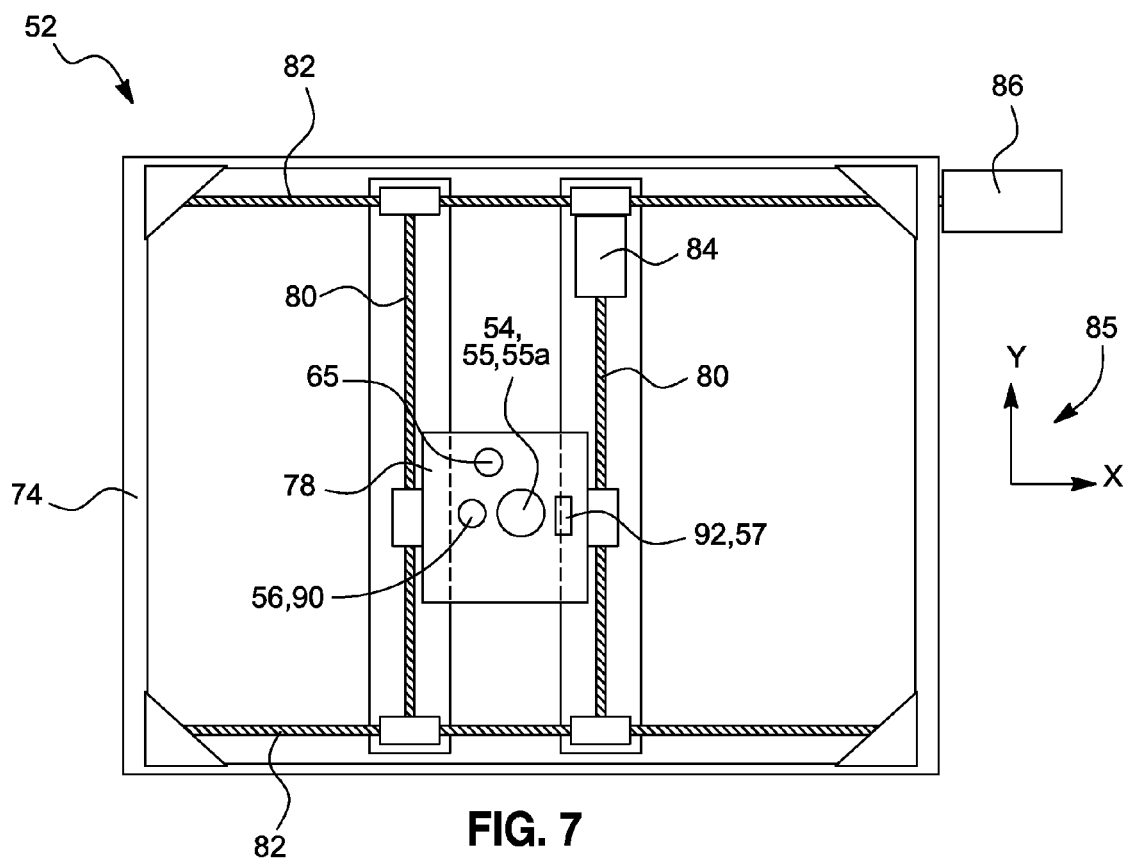
FIG. 7 is an illustration of a plan view of the machine tool shown in FIG. 6.

FIGS. 6 and 7 illustrate additional details of the machine tool 52 which forms part of the apparatus shown in FIG. 5. The machine tool 52 may include a frame 74 that may be removable from and supportable on the surface 35 of the composite structure 10 by legs 76 which may be adjustable in height to allow adjustment of the height of the frame 74 above the surface 35 of the composite structure 10. The area 88 beneath the frame 74 may be enclosed (not shown) and connected with a vacuum (not shown) in order to evacuate material that is being removed from the composite structure 10 by the machine tool 52. As shown in FIG. 7, the machine head 78 may be mounted to the machine tool 52 to allow movement of the machine head 78 along orthogonal x-y axes 85 on the frame 74. For example, the machine head 78 may be mounted to the machine tool 52 by means of a pair of screw drives and/or belt drives 80, 82 respectively powered by electric stepper or servo motors 84, 86 although the machine head 78 may be powered by a variety of alternative drive systems and is not limited to the drive systems described above. Furthermore, although not shown, a z-axis drive motor and rail with screw and/or belt drive may be provided to facilitate vertical positioning of the components of the machine head 78. In this manner, the machine head 78 may be precisely moved along the orthogonal axes 85 to any one of various positions relative to the surface 35 of the composite structure 10.

Referring still to FIGS. 6 and 7, a machine tool drive 55, which may comprise pneumatic, hydraulic, electric or other motor configuration, may be mounted on the machine head 78 and may include a cutting tool 54a. The cutting tool 54a may comprise a mill, router or other suitable cutting tool 54a. In an embodiment, the cutting tool 54a may be both rotated (via a spindle) and vertically displaced (i.e., in an axial direction) by the drive head 55a to facilitate removal of material from the composite structure 10. A laser displacement sensor 92 or other suitable distance measuring device 57 as indicated above may be provided to measure the distance between the machine tool 52 and the surface 35 (FIG. 6) of the structure 10 (FIG. 6) although the distance measuring device may be provided in a variety of configurations. After measuring the distance from the machine tool to one or more points or locations on the surface, the information may be stored and used to calculate alignment of the machine tool with the composite structure.

As shown in FIG. 6, the laser displacement sensor 92, may be mounted on the machine head 78 and may direct a laser beam 94 onto the surface 35 of the composite structure 10 in order to develop depth-of-cut and machine-to-part orientation information that may be used in controlling the drive head 55a. An ultrasonic sensor 90 having a spring loaded riding dribbler head 90a may be mounted on the machine head 78 by means of a retractable sensor mount 90b. The dribbler head 90a of the ultrasonic sensor 90 may be displaced downwardly into contact with the surface 35 of the composite structure 10 in order to internally scan the composite structure 10 to locate the boundaries of out-of-tolerance areas 24a, 24b, 24c (FIG. 1). The video camera 65 may be mounted on the machine head 78 and may be oriented to view the area of the cutting tool 54a for periodically or continuously recording images (not shown) of the material being removed. Such images may be displayed in real-time to a user such as on the user display 64b (FIG. 5) and/or may be used by the computer to control the operation of the machine head 78 including control of the cutting tool 54a.

Referring now to FIGS. 8A-8M, shown are a series of diagrammatic illustrations of a method of restoring a composite structure 104 having one or more tolerance areas such as out-of-tolerance areas 95a, 95b, 95c, 95d. The composite structure 104 may be restored using the machine tool 52 shown in FIGS. 5-7.

Figure 8A:
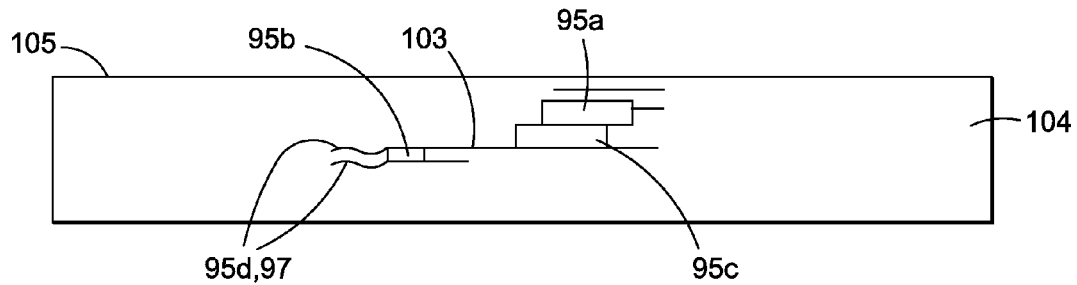
FIG. 8A is an illustration of a diagram showing a step in the progressive sequence of steps of a methodology for restoring the composite structure having one or more out-of-tolerance areas.

FIG. 8A illustrates a cross section of the composite structure 104 comprising multiple plies 103 which may have known or suspected out-of-tolerance areas 95a, 95b, 95c, 95d. The out of tolerance areas 95a, 95b, 95c may be detectable using NDI inspection techniques such as ultrasonic scanning or other methods as described above. For example, the NDI scanner 56 (FIG. 5) may use any one of a variety of technologies including, but not limited to, high and low frequency ultrasound, ultrasonic resonance, eddy current transduction, infrared thermography, laser shearography, backscatter X-ray, electro-magnetic sensing and terahertz sensing technology. The out-of-tolerance area 95d may comprise a bow wave 97 which may be undetectable by NDI inspection techniques and may only be detectable by visual observation upon removal of overlying material covering the plies 103 containing the bow wave 97. The bow wave 97 as shown in FIG. 8A may be characterized as a local distortion of one or more of the plies 103 of the composite structure 104 and may occur during the process of manufacturing the composite structure 104. For example, the bow wave 97 may occur during the process of co-bonding the stringer 16 (FIG. 1) to the skin 14 (FIG. 1) or during other manufacturing processes as was indicated above.

Figure 8B:
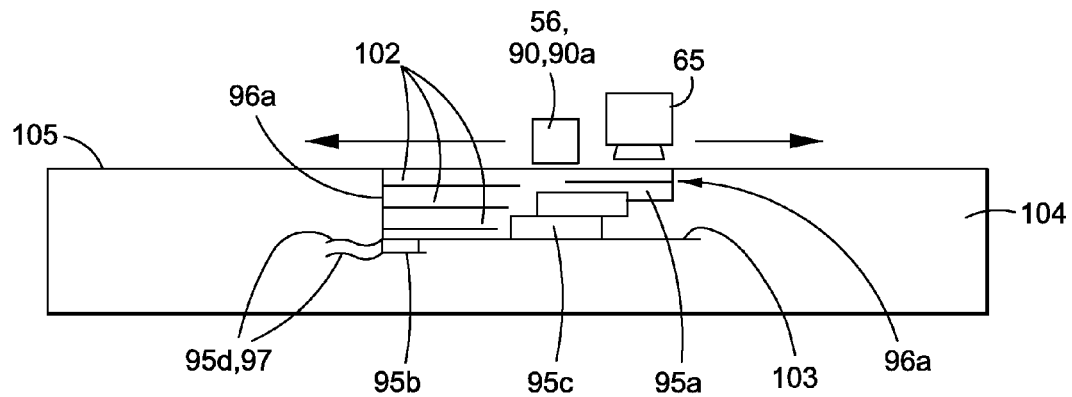
FIG. 8B is a side view illustration of a diagram showing a further step in the methodology for restoring the composite structure wherein a non-destructive inspection (NDI) scanner and optional video camera may be scanned along a surface of the composite structure to locating one or more of the out-of-tolerance areas.

Referring to FIG. 8B, the machine tool 52 (FIGS. 5-7) may be used to move the NDI scanner 56 comprising the ultrasonic sensor 90 with dribbler head 90a or other NDI scanner 56 configuration. The machine tool 52 (FIGS. 5-7) may move the NDI scanner 56 along the surface 105 of the composite structure 104 where out-of-tolerance areas 95a, 95b, 95c are suspected. The scanning process illustrated in FIG. 8B may detect and locate the out-of-tolerance area 95a and may approximate the boundaries 96a of the out-of-tolerance area 95a. As indicated above, the out-of-tolerance area 95a may be detectable using NDI inspection techniques such as ultrasonic inspection. The video camera 65 may also be moved along the surface 105 of the structure 104 with the NDI scanner 56. The video camera 65 may optionally provide a video feed to the user of the machine tool during scanning of the composite structure 104 with the NDI scanner 56. The video feed may be displayed on the display 64*b* (FIG. 5) for observation by the user. In this manner, the display may provide additional information to the user for indications of additional out-of-tolerance areas during the scanning.

Figure 8C:
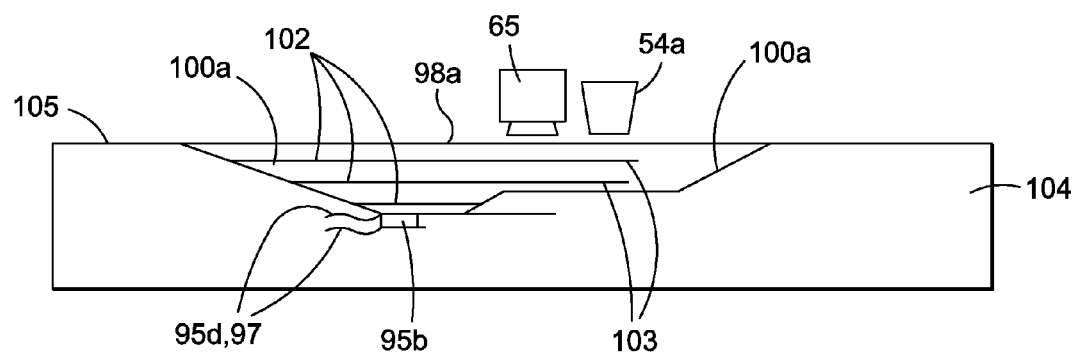
FIG. 8C is a side view illustration of a diagram showing a further step in the methodology for restoring the composite structure and illustrating a volume of material calculated for removal from the composite structure by a cutting tool.

Referring to FIG. 8C, based on the boundaries 96*a* of the out-of-tolerance area 95*a* (FIG. 8B), a volume 98*a* of material may be calculated by the computer 60 (FIG. 5) and selected for removal by the cutting tool 54*a* which may include removal of the out-of-tolerance area 95*a*. If available, data regarding the geometry of the composite structure 104 may be provided by a geometry database 68 (FIG. 5) that may be coupled to the computer 60 (FIG. 5). The calculation of the volume for removal from the composite structure 104 may be facilitated by overlaying or comparing the boundaries of the out-of-tolerance area 95*a* onto the data defining the geometry of the composite structure 104. A tool path (not shown) for guiding the movement of the cutting tool 54*a* may be calculated by the computer 60 (FIG. 5) based upon the geometry data and may be used to program the controller 58 (FIGS. 5-7) of the machine tool for controlling or guiding the movement of the machine tool and machine head including movement of the cutting tool 54*a* (FIG. 8C). A quantity of layers 102 may be selected for dividing the removal of the volume of material such that the machine tool pauses following removal of each one of the layers of the volume. The controller may be programmed with the tool path and the quantity of layers of the volume. As will be described in greater detail below, the video camera 65 may be scanned over the area uncovered following the removal of the layer to facilitate visual observation of the uncovered area to identify out-of-tolerance areas such as bow waves that may not be detectable by NDI inspection techniques.

Figure 8D:
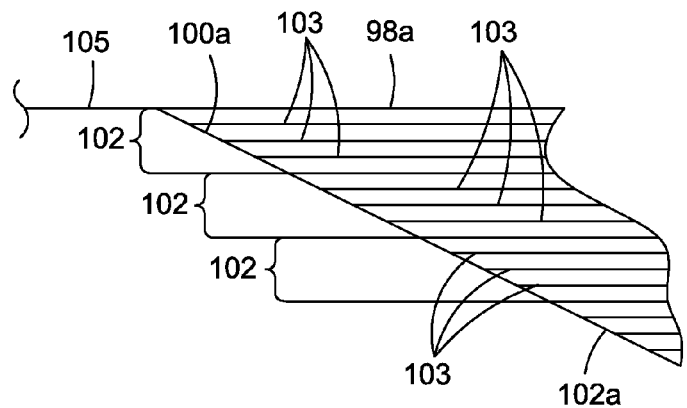
FIG. 8D is an enlarged cross-sectional illustration of a portion of the volume of material that may be removed from the composite structure and wherein the volume may be divided into a quantity of layers for which the cutting tool may be programmed to pause after removal of each one of the layers.

For example and referring to FIG. 8D, shown is an enlarged cross-sectional illustration of a portion of the final volume 98 (FIG. 8J) of material for removal from the composite structure 104 and wherein the volume 98*a* is divided into a quantity of layers 102. In this regard, the user may select a quantity of five (5) layers 102 for the volume of material that is to be removed. If the volume comprises a total of twenty (20) plies 103 of composite material, each layer 102 may contain four (4) plies 103 such that the controller of the machine tool may be programmed to pause after removal of each one of the layers 102 (i.e., after removal of each set of four (4) plies 103). The controller of the machine tool may be programmed to cause the video camera 65 to scan the area uncovered by the removal of the layer 102 for visual observation by the user. Such visual observation of the may allow the user to identify additional out-of-tolerance areas undetected by NDI techniques. The NDI scanner (e.g., ultrasonic sensor) may also scan the area scanned by the video camera in order to detect additional out-of-tolerance areas for removal that may not be detectable due to the removed overlying material.

Referring briefly back to FIG. 8C, the machine tool may be moved along the programmed tool path (not shown) such that the cutting tool 54*a* removes one of the layers 102 of the volume 98*a*. During removal of the volume 98*a* of material, the cutting tool 54*a* may also form an initial scarf 100*a* around the periphery of the volume 98*a* of material that is being removed. Removal of the volume 98*a* may reduce or eliminate the out-of-tolerance area 95*a* (FIG. 8A). The video camera 65 may optionally be moved along the tool path (not shown) as the cutting tool 54*a* removes the volume 98*a* and may provide video feed to the user for visual observation of the progress of the removal process.

Figure 8E:
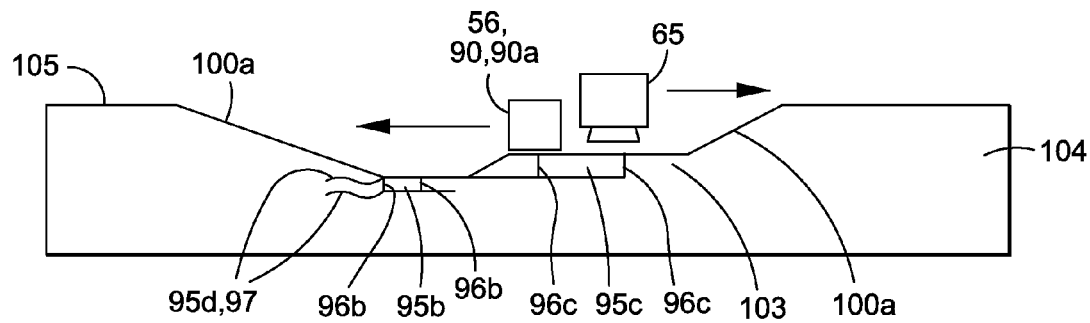
FIG. 8E is a side view illustration of a diagram showing a further step in the methodology for restoring the composite structure illustrating the volume of material removed from the composite structure and the NDI scanner and video camera scanned along the surface of the composite structure for locating additional out-of-tolerance areas.

Referring to FIGS. 8C and 8E, following removal of the first one of the layers 102 of the volume 98*a*, the operation of the cutting tool may be paused to allow for scanning of the area of the structure 104 uncovered by the removal of the layer 102 to locate the boundaries of additional out-of-tolerance areas such as out-of-tolerance area areas 95*b*, 95*c*. In this regard, the video camera 65 (FIG. 8E) may be scanned over the area of the structure 104 uncovered by the removal of the layer. If no additional out-of-tolerance areas are identified, the machine tool 52 continues on the tool path to remove the next one of the layers 102 of the volume. However, the scanning of the area uncovered by the removal of the layer 102 may result in the identification of additional out-of-tolerance areas 95*b*, 95*c* at deeper levels in the structure 104 that may have been previously undetectable by the overlying out-of-tolerance area 95*a*. In this regard, the scanning may locate the boundaries 96*b*, 96*c* of the additional out-of-tolerance areas 95*b*, 95*c*. By providing video feed to the user, locations of additional out-of-tolerance area may be identified. Simultaneously, the NDI scanner 56, which may include the ultrasonic sensor 90 and dribbler head 90*a*, may be scanned over the area of the structure 104 uncovered by the removal of the layer to facilitate the identification of additional out-of-tolerance areas.

Referring still to FIG. 8E, based on the located boundaries 96*b*, 96*c* of the additional out-of-tolerance areas 95*b*, 95*c*, the controller 58 (FIG. 5) may be reprogrammed such that the volume of material for removal includes the additional out-of-tolerance areas. In this regard, a new tool path may be programmed for the cutting tool that may result in the removal of the additional out-of-tolerance areas. Furthermore, the machine tool programming may be edited to alter the quantity of layers of the volume. For example, if it is desired to reduce the amount of material that is removed with each layer 102, the quantity of layers 102 may be increased for the volume. Increasing the quantity of layers 102 reduces the quantity of plies 12 that are removed with each layer 102 to allow for shorter intervals between scanning of the composite structure 104. Conversely, reducing the quantity of layers 102 for the volume may increase the quantity of plies 12 that are removed with each layer 102 such that a larger amount of material may be removed with each layer 102. The reprogramming of the controller may optionally include the selection of a different user-defined scarf angle for scarfing the edges 102*a* of the layers 102 of the volume 98*b* as compared to the scarf angle selected for the layers 102 of the volume 98*a* (FIG. 8B).

Figure 8F:
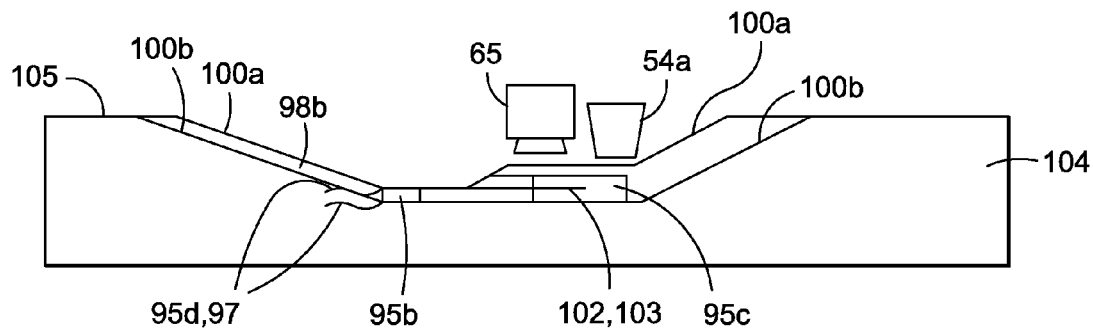
FIG. 8F is a side view illustration of a diagram showing a further step in the methodology for restoring the composite structure illustrating an additional volume containing an additional out-of-tolerance area for removal from the composite structure by the cutting tool.

FIG. 8F illustrates the volume 98*b* of material to be removed from the composite structure 104 and the scarf 100*b* to be formed in the composite structure 104 by the cutting tool 54*a* as a result of the reprogramming of the tool path such that the volume encompasses the additional out-of-tolerance areas 95*b*, 95*c*. The video camera 65 may also be moved along the surface of the structure 104 in association with the movement of the cutting tool 54*a* to facilitate observation of the removal process and to allow user intervention at any point during operation of the cutting tool 54*a*.

Figure 8G:
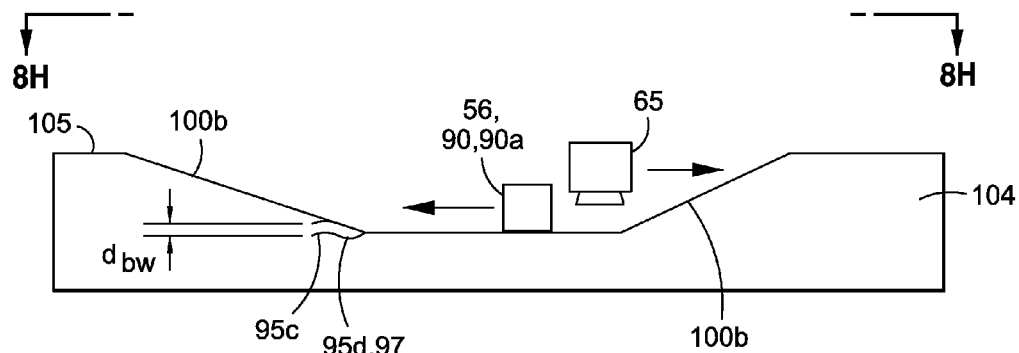
FIG. 8G is a side view illustration of a diagram showing a further step in the methodology for restoring the composite structure illustrating the NDI scanner and video camera scanned along the surface of the composite structure for locating additional out-of-tolerance areas such as a bow wave.

In FIG. 8G, the NDI scanner 56 and the video camera 65 may scan the composite structure 104 following the removal of each one of the layers 102 of the volume to determine whether there are any further out-of-tolerance areas that have not been detected. For example, as shown in FIG. 8B, the out-of-tolerance area 95*d* may be visually observed as a result of the video feed provided by the video camera 65 (FIG. 8G). The out-of-tolerance area 95*d* may be formed as a bow wave 97 which may be undetectable by the NDI scanner 56 but which may be visually observable by means of the video camera 65.

Figure 8H:
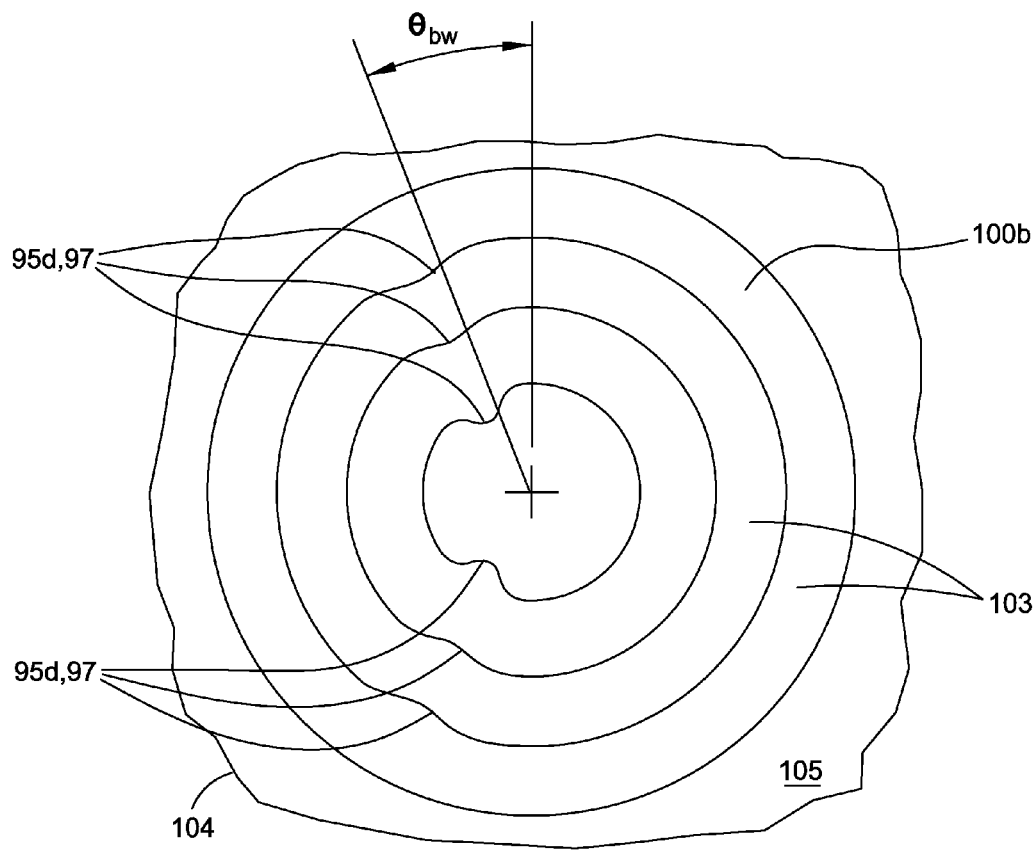
FIG. 8H a top view of the composite structure of FIG. 8G and illustrating the bow wave that may have been obscured by the overlying plies of material and which may be exposed by the removal of one of the layers of the volume.

FIG. 8H is a top view of the composite structure 104 of FIG. 8G and illustrating the bow wave 97 that may have been obscured by the overlying plies 103 and which may be exposed by the removal of one of the layers 102 of the volume. As indicated above, the bow wave 97 may be formed as a ripple or wave in one or more of the plies 103 of the composite structure 104. The NDI scanner 56 may be moved along with the video camera 65 to facilitate the location of the boundaries of the out-of-tolerance area encompassing the bow wave 97. For example, the NDI scanner may facilitate the prediction of the geometry of the bow wave 97. In this regard, the NDI scanner 56 illustrated in FIG. 8G may facilitate the prediction of the depth $d_{bw}$ (FIG. 8G) and angle $\theta_{bw}$ (FIG. 8G) of the bow wave 97 illustrated in FIGS. 8G-8H.

Based on the visual observation of the out-of-tolerance area 95d or bow wave 97 shown in FIG. 8G-8H, the controller 58 (FIG. 5) may be re-programmed with a new tool path (not shown) for the cutting tool 54a that may result in the removal of the additional volume containing the bow wave 97 of the out-of-tolerance area 95d. In this regard, of the cutting tool 54a removes a portion of the plies 103 of the composite structure 104 containing the out-of-tolerance area 95d. As indicated above, the programming may optionally include altering the quantity of plies 103 of the volume and selecting a scarf angle for the edges of the layers 102a.

Figure 8I:
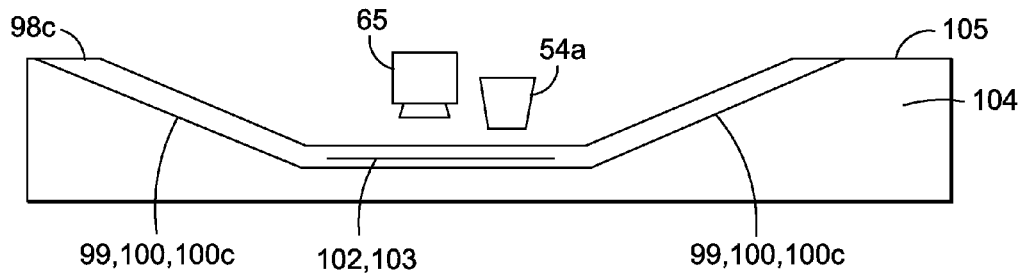
FIG. 8I is a side view illustration of a diagram showing a further step in the methodology for restoring the composite structure illustrating the volume containing an additional out-of-tolerance area such as the bow wave for removal from the composite structure by the cutting tool
Figure 8J:
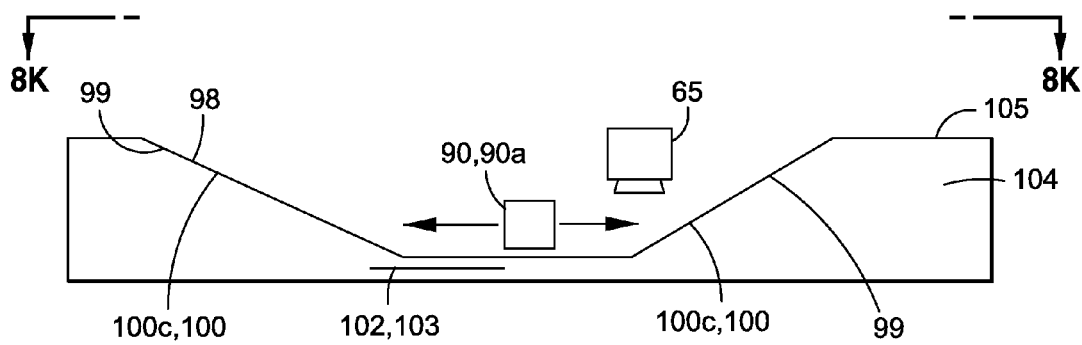
FIG. 8J is a side view illustration of a diagram showing a further step in the methodology for restoring the composite structure and illustrating the NDI scanner and the video camera scanning the composite structure following the removal of the of-tolerance area.

FIG. 8I illustrates the volume 98c of material to be removed in layers 102 from the composite structure 104 and the scarf 100c to be formed in the composite structure 104 by the cutting tool 54a as a result of the reprogramming of the tool path such that the volume 98c encompasses the out-of-tolerance areas containing the bow wave. FIG. 8J illustrates the movement of the NDI scanner 56 and the video camera 65 which may scan the composite structure 104 following the removal of each one of the layers 102 of the volume 98c. In this regard, the NDI scanner 56 and the video camera 65 scan the final volume 98 of material removed from the composite structure 104.

Figure 8K:
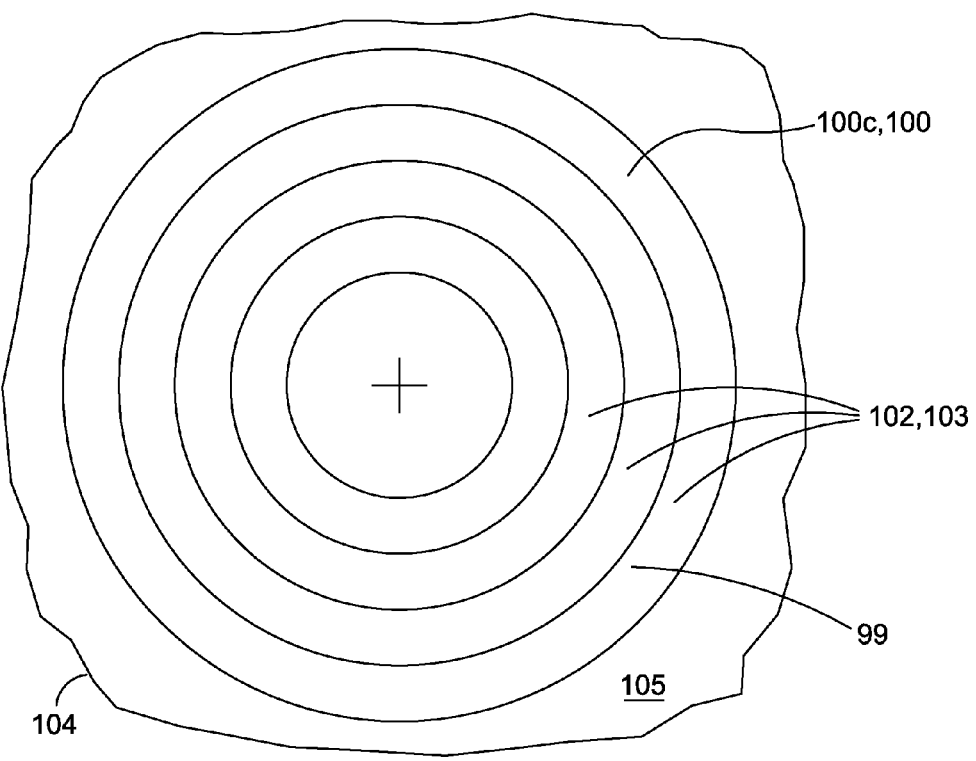
FIG. 8K is a top view of the composite structure of FIG. 8J illustrating the removal of the bow wave and which may be provided by the video camera.

FIG. 8K is a top view of the composite structure 104 of FIG. 8J illustrating the removal of the bow wave and which may be provided by the video camera for display on the display 64b (FIG. 5) of the machine tool. In this regard, the video camera provides a means to determine whether there are any further out-of-tolerance areas that have not been detected. The steps of removing each one of the layers 102 of the volume using the programmed machine tool, pausing the machine tool after removal of the layer 102, and scanning the area of the structure 104 uncovered by the removal of the layers 102 using the video camera and/or the NDI scanner may be iteratively performed until the volumes containing the out-of-tolerance areas are removed. As can be seen in FIG. 8K, the scarf 100c formed on the volume edge 99 of the removed volume may comprise the final scarf 100 of the composite structure 104.

Figure 8L:
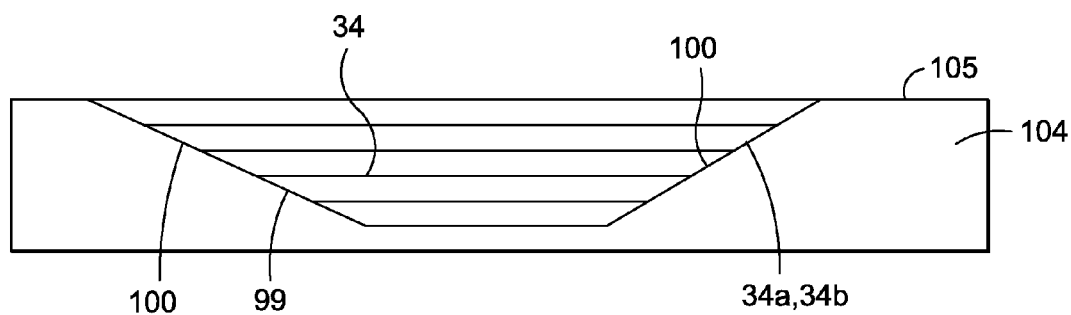
FIG. 8L is a side view illustration of a diagram showing a composite patch bonded to the composite structure in order to replace the material removed from the composite structure.
Figure 8M:
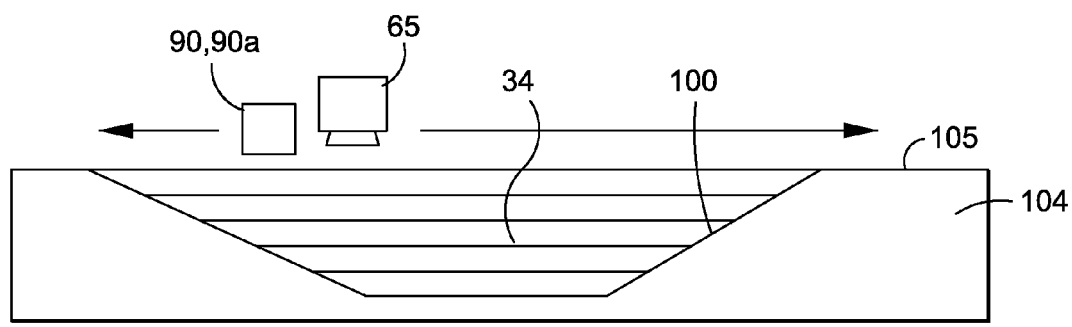
FIG. 8M is a side view illustration of a diagram showing an NDI scanner and a video camera re-scanning the composite patch installed on the composite structure to verify the integrity of the restoration.

Referring to FIG. 8L, once all the out-of-tolerance areas have been removed from the composite structure 104, a composite patch 34 may be fabricated and bonded to the composite structure 104 in order to replace the material removed from the structure 104. The computer 60 (FIG. 5) may be used to calculate the number, size and type of plies 12 required to fabricate the composite patch 34 based in part on volumes of material removed as calculated by the computer. The peripheral edge 34a of the composite patch 34 may include the scarf 34b that may substantially match the final scarf 100 of the composite structure 104. After the patch 34 has been bonded to the composite structure 104, the restoration including the composite patch 34 may be rescanned with the ultrasonic sensor 90 as shown in FIG. 8M in order to verify the integrity and the quality of the restoration.

Figure 9B:
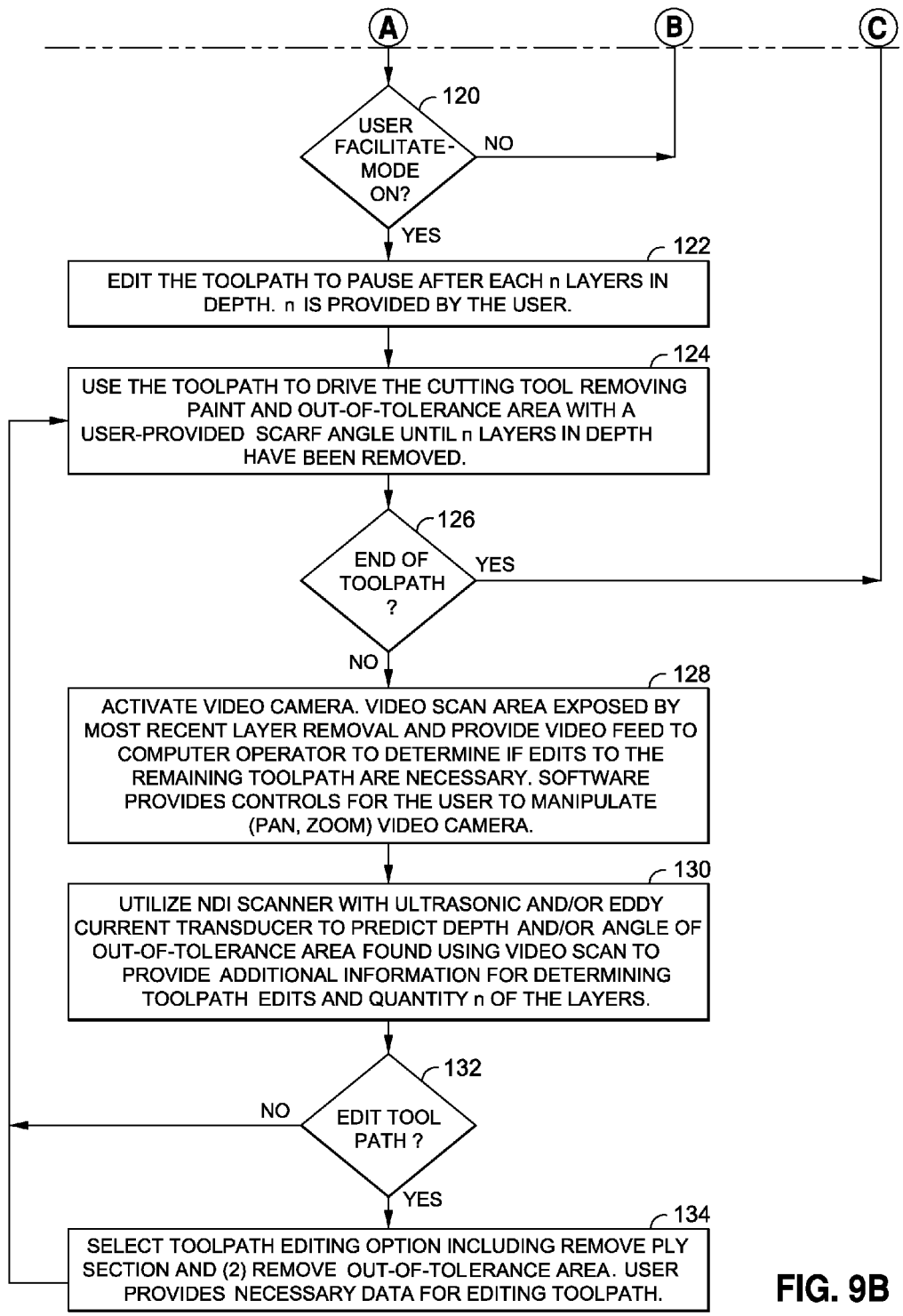
FIG. 9B is an illustration of the second portion of the flow diagram of the methodology of user-facilitated material removal from the composite structure.
Figure 11:
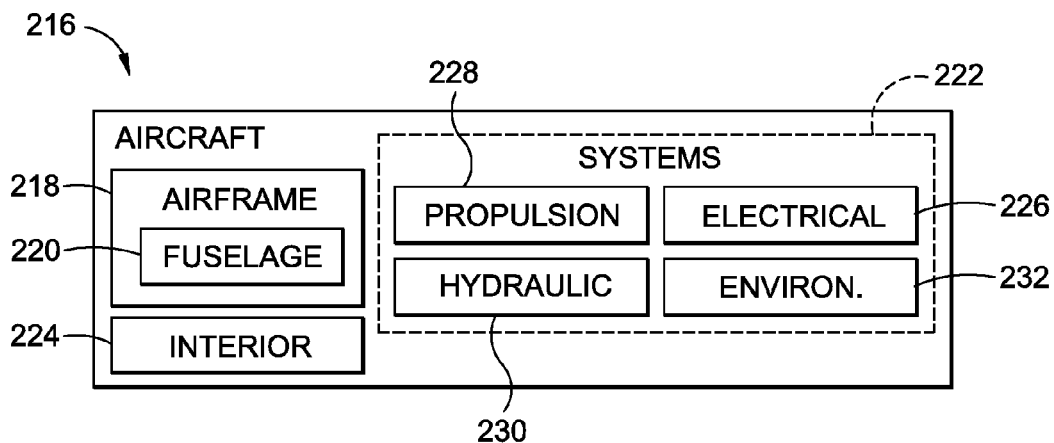
FIG. 11 is an illustration of a block diagram of an aircraft.

Referring to FIG. 9 comprising FIGS. 9A-9B, shown is an illustration of a flow diagram of a method of removing out-of-tolerance areas in a composite aircraft structure or airframe 218 (FIG. 11) which may be an airframe of an aircraft 216 (FIG. 11). For example and without limitation, the composite airframe may comprise an aircraft fuselage skin (not shown) formed of composite materials. As shown in FIG. 9A, the method may comprise step 108 wherein a frame of the machine tool 52 (FIGS. 5-7) may be mounted on the airframe 218 (FIG. 11) such as on the fuselage 220 (FIG. 11) of the aircraft at a location overlying and encompassing an area of the airframe requiring restoration. The frame of the machine tool may support a movable machine head 78 (FIGS. 5-7). A laser tracker or laser positioning system (not shown) may locate the machine tool relative to the airframe 218 (FIG. 11) within a known coordinate system which may be the coordinate system of the aircraft 216 (FIG. 11). The computer 60 (FIG. 5) may be used to retrieve airframe geometry from an airframe geometry database 110 (FIG. 9A) which may form part of the geometry database 68 previously described in connection with FIG. 5. At step 112, software may cause the computer to display on the user display (e.g., visual display) 64b (FIG. 5) the maximum area on the airframe that can be scanned without moving the machine tool. The user interface 64 (FIG. 5) may allow the user to determine the particular area on the airframe to be scanned.

At step 114, the area on the airframe selected by the user may be scanned such as with an NDI scanner 56 (FIG. 5) in order to identify any out-of-tolerance areas. For example, the boundaries of the out-of-tolerance area 95a, 95b, 95c (FIG. 8A) may be located by scanning the airframe using the NDI scanner 56 (FIG. 5) mounted to the machine head 78 (FIG. 5). At step 116, data representing the out-of-tolerance areas identified at step 114 including ply definitions of the out-of-tolerance areas may be retrieved from the database and overlaid on the airframe geometry. Using this overlaid information, the volume of material to be removed including the boundaries of the out-of-tolerance area may be calculated. The calculations may include calculating the portion to be removed for each ply in the airframe using a taper ratio or scarf angle that may be provided by the user. The user interface may allow the user to view each ply of the skin to be removed on the display.

Referring still to FIG. 9, in step 118, the computer may access the CAM application 70 (FIG. 5) via the API interface 72 (FIG. 5) and may use the CAM application 70 (FIG. 5) to generate the tool path for the cutting tool 54a (FIG. 5). The user may employ the user interface to input additional information used to program the machine tool including, but not limited to, the type of tool to be used, size of the tool, etc. Further in this regard, the process continues to step 120 (FIG. 9B) wherein the machine tool may be operated in a user-facilitated mode allowing the user to modify the tool path such that the machine tool pauses after removal of each one of n quantity of layers which the user may program into the tool path. If the user-facilitated mode is not activated in step 120, the process continues to step 136 (FIG. 9A) wherein the cutting tool (e.g., router) is driven along the tool path in an automated mode to remove coatings (e.g., paint) and material in all out-of-tolerance areas with a user-provided taper ratio or scarf angle. If the user-facilitated mode is activated in step 120 (FIG. 9B), then the process continues to step 122 (FIG. 9B) wherein a quantity of layers is selected by the user for the volume for which the machine tool will be paused following removal of each one of the layers. The quantity of layers is programmed into the controller.

In step 124 of FIG. 9B, the cutting tool is driven along the tool path to remove out-of-tolerance areas with the user-provided taper ratio or scarf angle. At step 126, the machine tool pauses at each one of the layers to allow for scanning by the video camera of the area uncovered by the removal of the layer. More specifically, when the machine tool is paused, the video camera may be activated in step 128 and the area of the airframe uncovered or exposed by the most recent layer removal may be scanned using the video camera in order to locate the boundaries of an additional out-of-tolerance area of the airframe as described above. The video scanning may facilitate a determination as to whether controller programming edits to the tool path are necessary in order to reduce or eliminate additional out-of-tolerance areas that may be identified by the visual observation. In this regard, the user interface may allow the use to manipulate (i.e., zoom, pan) the video camera.

In addition, at step 130 of FIG. 9B, the NDI scanner may be activated to facilitate the prediction of the geometry of bow waves (FIGS. 8G-8H) observed by means of the video camera. In this regard, the NDI scanner may facilitate the prediction of the depth and angle of the bow wave. If no tool path edits are necessary in step 132, the machine tool is reactivated for removal of another one of the layers in step 124. Upon reaching the end of the tool path in step 132, the process continues to step 136 of (FIG. 9A) wherein the cutting tool is driven along the tool path in the automated mode to remove coatings (e.g., paint) and all out-of-tolerance areas with a user-provided taper ratio or scarf angle in the airframe. In step 138 (FIG. 9A), the area of the airframe where the volume of material is removed may be rescanned to determine if there are additional non-conforming or out-of-tolerance areas previously undetectable by the previous scan due to overlying out-of-tolerance areas.

Referring back to step 132 (FIG. 9B), if additional out-of-tolerance areas such as bow waves are identified, then the tool path may be edited by reprogramming the controller such that the volume of material for removal includes the additional out-of-tolerance areas. In this regard, an additional volume of material may be calculated for removal from the airframe based upon the boundaries of the additional out-of-tolerance area. In step 134, such editing may include, but is not limited to, editing the programming to remove the bow wave, editing the programming to remove a portion of a ply, editing the quantity of layers into which the volume is divided, and editing the scarf angle. The steps of removing the layers, pausing the machine tool, scanning the area of the airframe uncovered by the removal of the layer, and editing the controller programming, may be performed iteratively until the volume of material or additional out-of-tolerance areas are reduced or removed.

Following the removal of all out-of-tolerance areas, the area of the composite structure from which the volume of material was removed may be rescanned in step 138 (FIG. 9A) as indicated above to determine if there are additional non-conforming or out-of-tolerance areas. If there are no additional out-of-tolerance areas in decision step 140 (FIG. 9A), the method proceeds to step 142 (FIG. 9A) where a final scarf angle or taper ratio (e.g., 30:1 taper ratio) may be calculated. The CAM application may be called up and a tool path (not shown) may be generated to remove additional material required to produce the final scarf angle. The user may provide additional information during this step including, without limitation, the type and size of the cutting tool. At step 144 (FIG. 9A), using the tool path generated at step 142 (FIG. 9A), the cutting tool may remove additional coating (e.g., paint) and ply areas necessary to complete the scarf with a pre-selected or user-defined final scarf angle or taper ratio.

The method may further include replacing the volume of the structure (e.g., airframe) that may be removed by the machine tool. For example, as shown in FIG. 2, the method may comprise bonding a patch 34 to the composite structure 10 to replace the volumes removed by the machine tool in the manner described above. In this regard, the patch 34 may be provided in a configuration similar to that which is shown in FIG. 2 wherein the patch 34 may be configured to substantially fill the volume 30 (FIG. 1) of material removed from the composite structure 10. In an alternative embodiment not shown, the patch may be provided in a doubler or blister configuration (not shown) which may be mounted to an inner and/or outer mold line (not shown) of the composite structure such as in an area over the volume of material removed from the composite structure. The patch may alternatively be formed as a combination of a scarfed and doubler configuration (not shown) which may be mounted to the inner and/or outer mold lines (not shown) of the composite structure. The patch may be mounted to the composite structure by any suitable means such as by bonding and/or with mechanical fasteners (not shown) or any combination thereof as part of the restoration of the composite structure having one or more out-of-tolerance areas.

Figure 10:
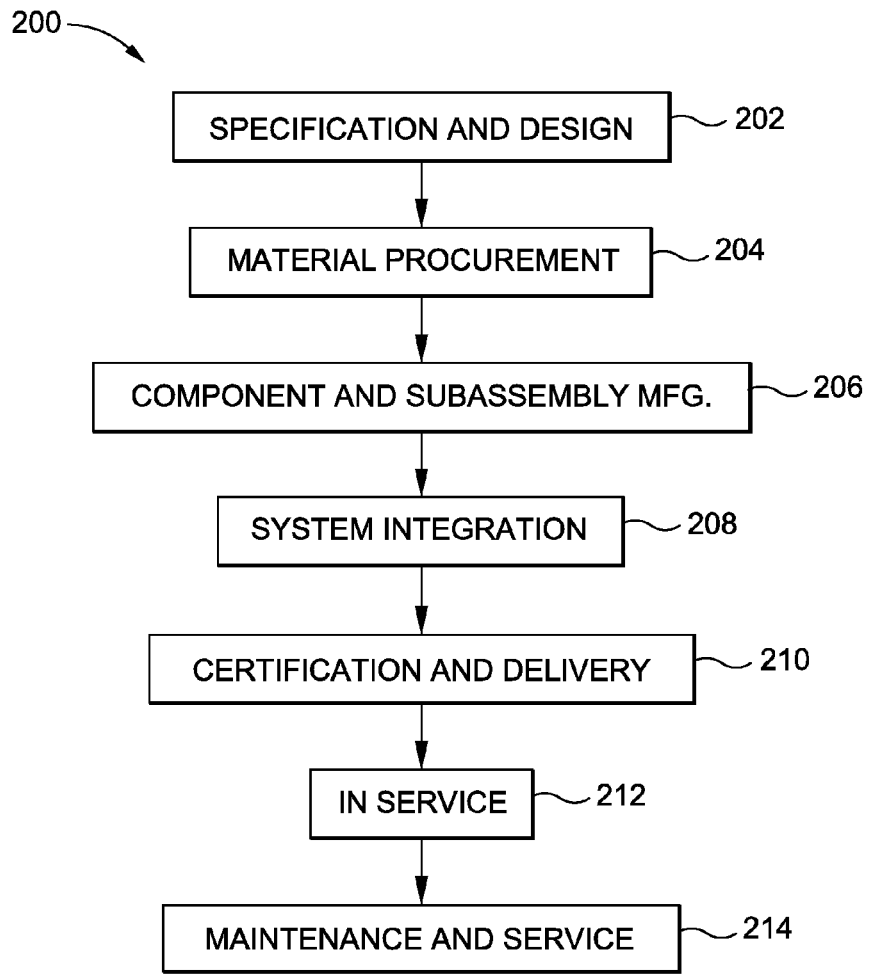
FIG. 10 is an illustration of a flow diagram of aircraft production and service.

Embodiments of the disclosure may find use in a variety of potential applications, particularly in the transportation industry, including for example, aerospace and marine applications. Thus, referring now to FIGS. 10 and 11, embodiments of the disclosure may be used in the context of an aircraft manufacturing and service method 200 as shown in FIG. 10 and an aircraft 216 as shown in FIG. 11. During pre-production, exemplary method 200 may include specification and design 202 of the aircraft 216 and material procurement 204 in which the disclosed method and apparatus may be specified for use in restoring or reworking areas of composite parts or components used in the aircraft 216. During production, component and subassembly manufacturing 206 and system integration 208 of the aircraft 216 takes place. The disclosed method and apparatus may be used to restore or rework areas of composite parts or components used in the aircraft 216 during these production processes. Thereafter, the aircraft 216 may go through certification and delivery 210 in order to be placed in service 212. While in service by a customer, the aircraft 216 is scheduled for routine maintenance and service 214 (which may also include modification, reconfiguration, refurbishment, and so on). The disclosed method and apparatus may be used to restore or rework composite parts on the aircraft 216 during the maintenance and service 214.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 216 produced by exemplary method 200 may include an airframe 218 with a plurality of systems 222 and an interior 224. The airframe 218 may include a fuselage 220. The disclosed method and apparatus may be used to restore or rework composite parts which form part of, or may be installed on the airframe 218, including the fuselage 220. Examples of high-level systems 222 include one or more of a propulsion system 228, an electrical system 226, a hydraulic system 230, and an environmental system 232. Any number of other systems may be included. Although an aerospace example is shown, the principles of the disclosure may be applied to any other industry without limitation such as the marine and automotive industries.

The disclosed method and apparatus may be employed to restore or rework composite parts during any one or more of the stages of the production and service method 206. For example, components or subassemblies corresponding to production process 206 may be reworked or restored using the disclosed method and apparatus. Also, one or more method embodiments, or a combination thereof may be utilized during the production stages 206 and 208, for example, by substantially expediting assembly of or reducing the cost of an aircraft 216. Similarly, the disclosed method and apparatus may be used to restore or rework composite parts that are utilized while the aircraft 216 is in service.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of removing an out-of-tolerance area in a composite structure, comprising the steps of:
   scanning, using a video camera and a non-destructive inspection (NDI) scanner, an area of the composite structure;
   determining a location of an out-of-tolerance area within the composite structure in response to scanning using the video camera and the NDI scanner;
   selecting a volume of the composite structure to be removed based on the location of the out-of-tolerance area;
   programming a machine tool to remove the volume and to pause after removal of each one of a quantity of layers of the volume; and
   removing one of the layers using the machine tool.

2. The method of claim 1 further comprising the steps of:
   pausing the machine tool after removal of the layer; and
   scanning, after pausing the machine tool, the area of the composite structure uncovered by the removal of the layer to determine an existence of an additional out-of-tolerance area.

3. The method of claim 2 wherein the steps of removing one of the layers using the programmed machine tool, pausing the machine tool after removal of the layer, and scanning the area of the composite structure uncovered by the removal of the layer are iteratively performed.

4. The method of claim 2 wherein the step of scanning, after pausing the machine tool, the area of the composite structure uncovered by the removal of the layer includes:
   providing a video feed to a user of the machine tool for observation of the location of the additional out-of-tolerance area.

5. The method of claim 4 further comprising the step of:
   determining the location of the additional out-of-tolerance area based upon the video feed.

6. The method of claim 1 further comprising the step of:
   editing the machine tool programming such that the volume of the composite structure to be removed includes an additional out-of-tolerance area.

7. The method of claim 1 further comprising the step of:
   editing the machine tool programming to remove a bow wave.

8. The method of claim 1 wherein the composite structure is a multi-ply layup, each layer of the quantity of layers comprising at least one ply, the method further comprising the step of:
   editing the machine tool programming to alter the quantity of layers of the volume.

9. The method of claim 1 further comprising the step of:
   forming a scarf in the composite structure along an edge of a volume of material being removed.

10. The method of claim 1 further comprising the step of:
    bonding a patch to the composite structure to replace the volume removed by the machine tool.

11. A method of removing at least one out-of-tolerance area in a composite structure, the method comprising the steps of:
    scanning, using a video camera and a non-destructive inspection (NDI) scanner, an area of the composite structure;
    locating boundaries of an out-of-tolerance area within the composite structure in response to scanning using the video camera and the NDI scanner;
    calculating a volume of material for removal from the composite structure based upon the boundaries;
    calculating a tool path for guiding a machine tool for removal of the volume;
    selecting a quantity of layers of the volume for pausing the machine tool following removal of each one of the layers;
    programming a controller with at least one of the tool path and the quantity of layers of the volume;
    removing one of the layers using the machine tool;
    pausing the machine tool after removal of a layer; and
    scanning the area of the composite structure uncovered by the removal of the layer to locate the boundaries of an additional out-of-tolerance area.

12. The method of claim 11 wherein the step of scanning, using the video camera, the area of the composite structure uncovered by the removal of the layer includes:
    providing video feed to a user of the machine tool for observation of the location of the additional out-of-tolerance area.

13. The method of claim 12 further comprising the step of:
    determining the location of the additional out-of-tolerance area based upon the video feed.

14. The method of claim 11 wherein the composite structure is a multi-ply layup, each layer of the quantity of layers comprising at least one ply, the method further comprising the step of:
    editing the controller programming to alter the quantity of layers of the volume.

15. The method of claim 11 further comprising the steps of:
    visually identifying a bow wave in an image of the composite structure;
    re-programming the controller to provide a new tool path for a cutting tool; and
    removing, using the cutting tool, the bow wave in response to re-programming the controller to provide the new tool path.

16. The method of claim 15 further comprising the step of:
    determining a boundary of the bow wave based on an image the composite structure provided by a video camera.

17. The method of claim 15 further comprising the step of:
    predicting at least one of a depth and an angle of the bow wave based on the scanning of the composite structure by a non-destructive inspection (NDI) scanner.

18. A method of restoring a composite structure having at least one out-of-tolerance area, the method comprising the steps of:
- scanning, using a video camera and a non-destructive inspection (NDI) scanner, an area of the composite structure;
- locating boundaries of an out-of-tolerance area within a composite structure in response to scanning using the video camera and the NDI scanner;
- calculating a volume of material for removal from the composite structure based upon the boundaries;
- calculating a tool path for guiding a machine tool for removal of the volume;
- selecting a quantity of layers of the volume for pausing the machine tool following removal of each one of the layers;
- programming a controller with the tool path and the quantity of layers of the volume;
- removing one of the layers using the machine tool;
- pausing the machine tool after removal of a layer;
- scanning the area of the composite structure uncovered by the removal of the layer to locate the boundaries of an additional out-of-tolerance area;
- editing the controller programming such that the volume of material for removal includes the additional out-of-tolerance area;
- iteratively performing the steps of removing one of the layers, pausing the machine tool, scanning the area of the composite structure uncovered by the removal of the layer, and editing the controller programming, until the volume of material is removed; and
- replacing the volume of the composite structure removed by the machine tool.

* * * * *